United States Patent
Olsen et al.

(10) Patent No.: US 7,261,590 B2
(45) Date of Patent: Aug. 28, 2007

(54) RACK-MOUNTED PUNCHDOWN PANEL AND PUNCHDOWN BASE

(75) Inventors: Trevor Norman Olsen, Frankfort, IL (US); Lupco Zabjanovski, Countryside, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/112,163

(22) Filed: Apr. 22, 2005

(65) Prior Publication Data

US 2005/0239344 A1    Oct. 27, 2005

Related U.S. Application Data

(60) Provisional application No. 60/565,292, filed on Apr. 26, 2004.

(51) Int. Cl.
*H01R 13/60* (2006.01)

(52) U.S. Cl. .................................................. 439/532

(58) Field of Classification Search ............... 439/532, 439/404, 49, 719
See application file for complete search history.

(56) References Cited

U.S. PATENT DOCUMENTS

| | | | |
|---|---|---|---|
| 3,501,736 A | 3/1970 | Norris | |
| 3,521,129 A | 7/1970 | MacKenzie, Jr. | |
| 3,611,264 A | 10/1971 | Ellis, Jr. | |
| 3,777,223 A | 12/1973 | Chandler et al. | |
| 3,778,750 A | 12/1973 | Caveney et al. | |
| 3,798,587 A | 3/1974 | Ellis, Jr. et al. | |
| 4,118,095 A | 10/1978 | Berglund et al. | |
| 4,968,260 A * | 11/1990 | Ingalsbe | 439/76.1 |
| 4,975,072 A * | 12/1990 | Afshar | 439/131 |
| 5,035,645 A * | 7/1991 | Siemon et al. | 439/532 |
| 5,083,941 A * | 1/1992 | Rodgers et al. | 439/532 |
| 5,312,270 A * | 5/1994 | Siemon et al. | 439/532 |
| 5,352,136 A | 10/1994 | Chen | |
| D359,289 S * | 6/1995 | Abucewicz | D14/256 |
| RE35,030 E | 8/1995 | Siemon et al. | |
| 5,741,153 A * | 4/1998 | Schwer | 439/491 |
| 5,800,187 A * | 9/1998 | Vermon et al. | 439/92 |
| 5,806,811 A * | 9/1998 | Viklund et al. | 248/49 |
| 5,836,786 A * | 11/1998 | Pepe | 439/557 |
| 6,027,369 A * | 2/2000 | Conorich et al. | 439/532 |
| 6,101,079 A * | 8/2000 | Viklund | 361/119 |
| 6,302,746 B1 * | 10/2001 | Nath | 439/719 |
| 6,866,541 B2 * | 3/2005 | Barker et al. | 439/540.1 |

OTHER PUBLICATIONS

AT&T 110 Patch Panel System Brochure, 2 pages, 1990.
Panduit Pan-Punch™ 110 Punchdown Systems Installation Instructions, 2 pages, 2002.
Panduit Network Connectivity Solutions Catalog, front cover, pp. E17-E20, pp. E23-E24 and back cover, Jul. 2003.

* cited by examiner

*Primary Examiner*—Neil Abrams
*Assistant Examiner*—Phuongchi Nguyen
(74) *Attorney, Agent, or Firm*—Robert A. McCann; Christopher S. Clancy

(57) ABSTRACT

The present invention is directed to rack-mounted punchdown panels providing enhanced access for establishing connections. The present invention is also directed to punchdown bases providing increased capacity for wire management.

11 Claims, 5 Drawing Sheets

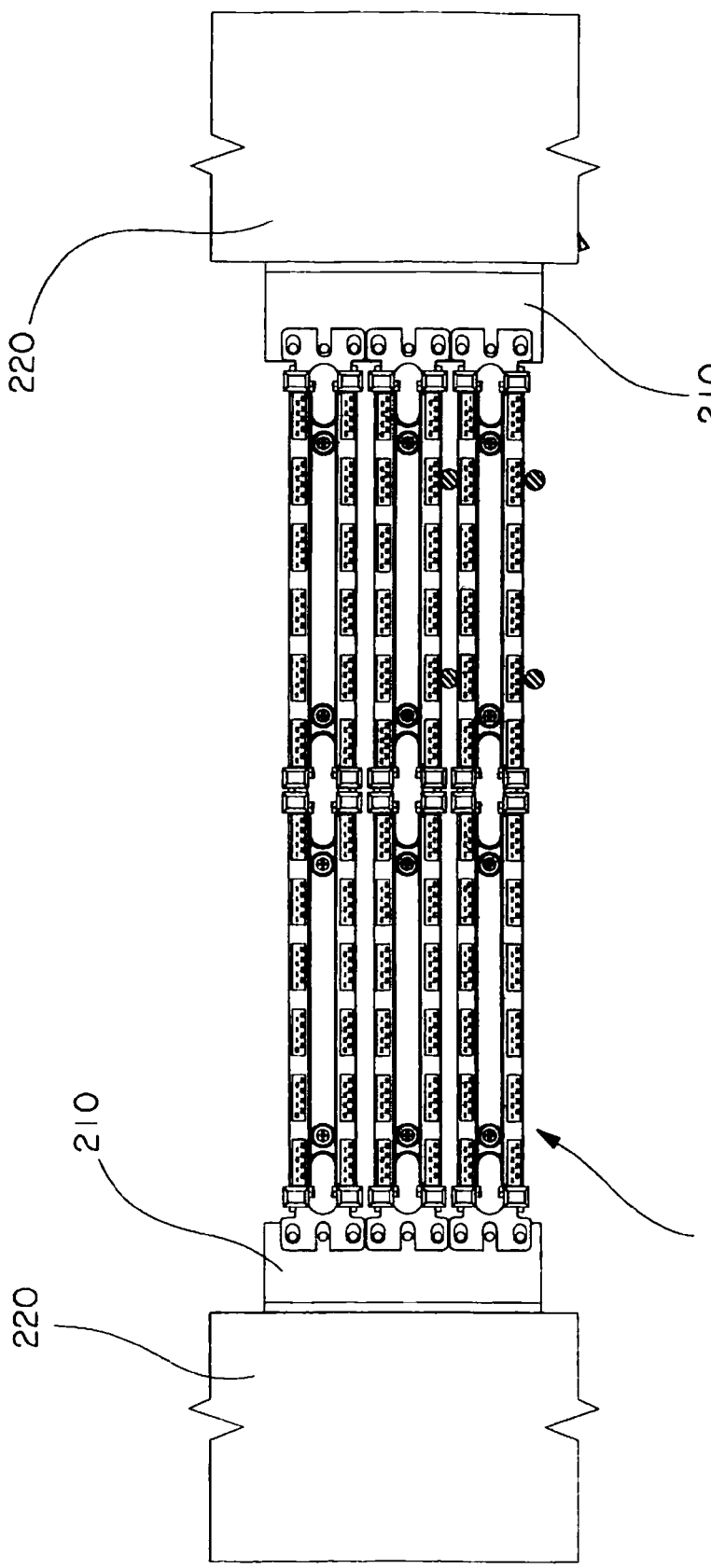

RACK-MOUNTED PUNCHDOWN PANEL AND PUNCHDOWN BASE

CROSS-REFERENCE TO RELATED APPLICATIONS

This Application claims priority to Provisional Application Ser. No. 60/565,292, filed on Apr. 26, 2004, the entirety of which is hereby incorporated by reference.

FIELD OF INVENTION

The present invention is directed to rack-mounted punchdown panels providing enhanced access for establishing connections. The present invention is also directed to punchdown bases providing increased capacity for wire management.

DESCRIPTION OF RELATED ART

As the use of telecommunications equipment increases in amount and variety of applications, more efficient communications management systems are needed. In many systems, the junction point for voice, data and other communication hardware can become extremely disorganized unless appropriately configured and connected communications racks are employed. In smaller applications, a single, small board or rack may be sufficient, while in larger applications many adjacent or arrayed full-size telecommunication racks may be necessary.

Known designs for telecommunications racks include one or more tall, rectangular metal frames in which various devices and connectivity equipment are attached or otherwise mounted. In one common arrangement, a face of the rack is utilized to accommodate input and output lines while the opposite face is used to connect cables so that various inputs and outputs can be interconnected. In a second common arrangement, a rack system includes several racks adjacently situated, with a rack on one end accommodating input and output lines and a rack on another end connecting cables so that various inputs and outputs can be interconnected. Racks within and between the end racks function to appropriately connect the inputs and outputs in a desired configuration and to provide routing to and from intermediate electrical components.

While the cable configurations on these known racks can vary from application to application, such racks typically have cabling running vertically near the vertical sides of the frame, occasionally in a channel or a vertical cable manager. Individual cables run across the rack to various devices or connectivity equipment, such as, for example, a patch panel, splice drawer, connector module or fiber optic enclosure. Such racks often also include cable routing structures running horizontally at the top and/or bottom of the rack to organize and direct cables as they enter or exit the rack system as well as to maintain cables in appropriate arrangement within the rack. Additional ducts or cable management structures may also be used to further route and organize cable on the rack to the extent necessary in particular applications.

While telecommunications racks present useful solutions to a number of problems relating to organization and storage in a telecommunications system, other problems and/or concerns remain. One common concern is aesthetics. Due to the significant amount of cabling and electronic and connectivity equipment employed in most telecommunications systems, the node where these various elements meet can be extremely unsightly and, if in plain view, can propagate misperceptions regarding the organization and quality of a particular connection configuration or the system itself.

Balanced against this concern regarding appearance are concerns regarding function. In some systems, it is necessary, either on occasion or frequently, to add, remove or alter connections and/or equipment. The manner in which connections are made can drastically affect the ease and efficiency with which these operations can be connected. While many of these concerns can be addressed through innovations in the telecommunications rack, great improvement in appearance and function can be achieved by innovations in the design of individual components, and especially connectivity equipment.

Punchdown panels are well known connectivity devices. The panels can be attached to a telecommunications rack with other components to provide an interface between incoming or outgoing cable and other devices and applications. Punchdown panels include mounting holes or other mounting features that allow the panels to be mounted to a telecommunications rack. The panels can be mounted in close proximity, one over another, or can be interposed between other equipment on a telecommunications rack. The panels include wire strips, or insulation displacement connectors, that permit a connection to be made between the panel and an insulated wire. The term "punchdown" relates to the process of pressing an insulated wire down into a wire strip or insulation displacement connector to remove or displace the insulation on the wire and make a connection with the panel. Further connectivity to the panel can be achieved using patch cords or other devices.

SUMMARY OF THE INVENTION

A punchdown panel permits interface with multiple wires in a relatively small area. Because such interface is possible, a punchdown panel includes design elements to accommodate connection with numerous wires while maintaining aesthetics and functionality. For example, known punchdown panels include multiple access openings allowing wire to pass from the back of the panels to the front of the panels for attachment to insulation displacement connectors. Such access openings are generally situated on punchdown panels between or near the insulation displacement connectors to which wires will be connected. The access openings are usually large enough to allow ingress or egress of multiple wires. The difficulty with such access openings, however, is that they are formed in structural elements of the punchdown panels, and thus the size and location of the openings are limited. As a result, multiple wires will pass through a single access opening in a particular location on the punchdown panel in order to contact multiple insulation displacement connectors in multiple locations. This arrangement can make removing, installing or altering a wiring configuration extremely cumbersome because it may be necessary to remove some or all of the wires passing through a single access opening in order to install or remove a single wire through the opening. While it has been suggested that passing wires over the side of a punchdown panel, rather than using access openings, could be one manner of avoiding this difficulty, such an arrangement is wasteful of space and prohibits the possibility of adding additional punchdown panels or other equipment in close proximity to those panels that have already been installed.

In addition to providing for wire access, it is necessary that wires connected to a punchdown panel be well organized. Various structural elements are included in punchdown panels to provide for such organization. For example, many punchdown panels include upright members configured in various locations to corral wire that is attached to the insulation displacement connectors. Also, a space or corridor can be provided between rows of insulation displacement connectors to make wires that are connected to the punchdown panel less obtrusive. In many known configurations, these organization solutions are insufficient. For example, corridors provided between the insulation displacement connectors can be too small to accommodate the number of wires that could feasibly be connected to the insulation displacement connectors surrounding the corridor.

The present invention provides punchdown panels and punchdown bases that provide solutions to the difficulties identified above. Namely, punchdown panels are provided that are structured to permit wires to be passed from the back of the panel to the front of the panel at any position over a side of the panel, even when multiple panels are installed in close proximity. This function is possible because the punchdown panels according to this invention are varied in width, such that a mounting section of the panel is wider than a punchdown section of the panel. Thus, when the mounting sections of two punchdown panels according to this invention are mounted in close proximity on a telecommunications rack, an access channel remains between the adjacent punchdown sections of the panels. This arrangement simplifies the task of removing, installing or altering a wiring configuration so that a single wire can be installed or removed, without disturbing other wires attached to the panel. Furthermore, side access to the punchdown panel is achieved, without compromising the ability to mount multiple panels in close proximity on a telecommunications rack.

Punchdown bases are provided that include an enlarged space between insulation displacement connectors. The enlarged space is made possible by reducing the profile of structural supports that are generally provided between insulation displacement connectors. As a result of this enlarged space, wires that are connected to the punchdown base are less obtrusive, and a greater number of wires can be organized in this less obtrusive manner.

In various exemplary embodiments, the punchdown panels according to this invention include a mounting panel and a punchdown base. The punchdown base includes a plurality of insulation displacement connectors, and the mounting panel includes a mounting section and a punchdown section. Preferably, the mounting section includes mounting holes for attaching the punchdown panel to a telecommunications rack, and the punchdown section contacts the punchdown base and includes one or more access openings. The mounting section is greater in width than the punchdown section, such that when the punchdown panel is mounted in close proximity to another device, an access channel is created between the punchdown section and the adjacent device allowing wires to be passed from the back of the panel to the front of the panel at any position on the side of the panel.

In various exemplary embodiments, the punchdown bases according to this invention include a wire receptacle base in contact with at least one insulation displacement base and at least one upright member on each of two sides. The punchdown base includes a wire receptacle area having boundaries formed by the wire receptacle base and the at least one insulation displacement base and the at least one upright member at each of the two sides. Preferably, no structural members are situated in the wire receptacle area.

For a better understanding of the invention as well as other aspects and further features thereof, reference is made to the following drawings and descriptions.

BRIEF DESCRIPTION OF THE DRAWINGS

FIG. 2(a) is a front view of exemplary punchdown panels according to this invention installed in a telecommunications rack;

For a better understanding of the invention as well as other aspects and further features thereof, reference is made to the following drawings and descriptions.

DETAILED DESCRIPTION OF PREFERRED EMBODIMENTS

Figure 1:
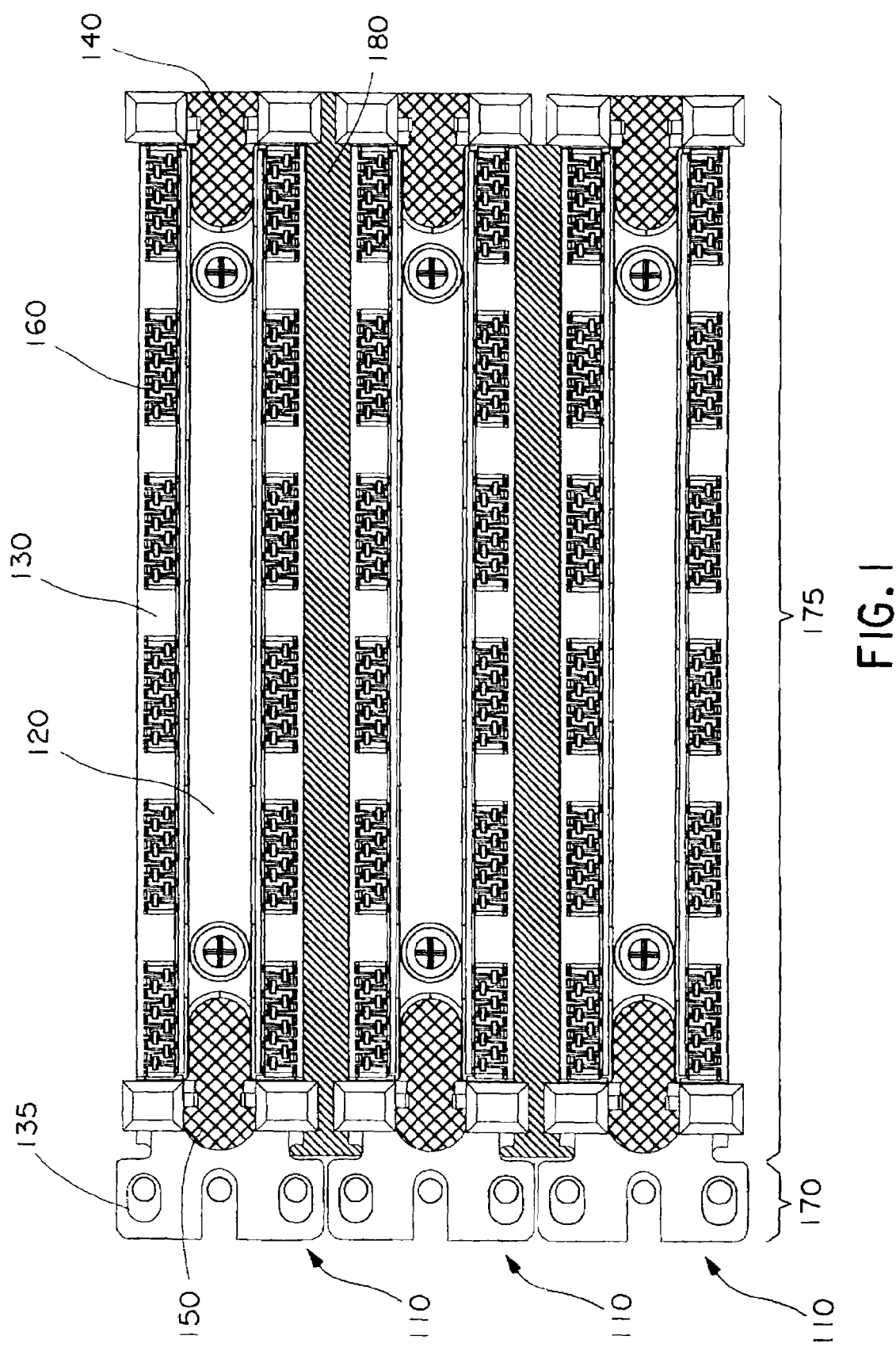
FIG. 1 is a partial front view of exemplary punchdown panels according to this invention.

FIG. 1 is a partial front view of an exemplary embodiment of the punchdown panels 110 according to this invention. In FIG. 1, one-half of each of three punchdown panels 110 are shown. The punchdown panels 110 include a mounting panel 120 and a punchdown base 130. The mounting panel 120 is a generally rectangular support member including various features allowing for mounting the punchdown panel 110 to a telecommunications rack and for ingress and egress of cables. The mounting panel 120 can be formed from any suitable material. For example, the mounting panel 120 can be stamped and formed from metal sheet material. Exemplary features for mounting the punchdown panel 110 to a telecommunications rack include mounting holes 135. The punchdown panel 110 can be mounted to a telecommunications rack by passing a screw and nut combination or other fastener through the mounting holes 135 and corresponding holes on the telecommunications rack. The mounting panel 120 also includes central access openings 140 and end access openings 150 permitting ingress and egress of cables. The mounting holes 135 and openings 140, 150 can be formed in the mounting panel, by any suitable means.

Mounted on the punchdown panel 110 is a punchdown base 130. The punchdown base 130 can be formed of any suitable material. For example, the punchdown base 130 can be formed from a rigid plastic material that exhibits some compliancy and resilience. The punchdown base includes a plurality of insulation displacement connectors 160 situated along the length of the punchdown base 130. In the embodiment shown in FIG. 1, the insulation displacement connectors 160 are arranged end-to-end in two rows on the punchdown base 130. Other configurations could also be employed.

The punchdown panel 110 includes two sections of different widths. The first section is a mounting section 170 and the second section is a punchdown section 175. The mounting section 170 is wider (top-to-bottom in FIG. 1) than the punchdown section 175. As a result, when two or more punchdown panels 110 are mounted in close proximity on a telecommunications rack, the wider mounting sections 170 abut, while an access channel 180 remains between the punchdown sections 175. The access channel 180 allows access to the insulation displacement connectors 160 by wires passed from the back of the punchdown panel 110 at any point along the length of the punchdown base 130.

The mounting sections 170 can differ in width from the punchdown sections 175 by any suitable amount. Ideally, the difference in width will be selected with respect to the diameter of wires that are to be connected to the punchdown panel 110, so that such wires can be easily passed from the back of the panel 110 to the front of the panel 110 via the access channel 180. In the embodiment shown in FIG. 1, the mounting sections 170 are 0.370 inches wider than the punchdown sections 175. This difference in width is distributed on both sides of the punchdown panel 110 so that a 0.185 inch distance exists between the outermost edge of the punchdown section 175 and the outermost edge of the mounting section 170. Accordingly, when two punchdown panels 110 according to the embodiment shown in FIG. 1 are mounted in proximity, the access channel 180 created between the respective panels 110 will be at least 0.370 inches in width.

FIG. 2(a) is a front view of exemplary punchdown panels 110 according to this invention installed on a telecommunications rack 210. FIG. 1 shows only a partial view of three exemplary punchdown panels 110. FIG. 2(a) provides a full front view of three punchdown panels 110, as installed on a telecommunications rack 210. The telecommunications rack 210 includes a pair of vertical supports to which the punchdown panels 110 or other telecommunications components can be mounted. The rack 210 is situated on the interior surface of a vertical cable manager 220. The vertical cable manager 220 includes a second pair of vertical supports on which the telecommunications rack 210 can be mounted. The vertical cable manager 220 can be provided with an interior channel and openings, through which cable can be passed.

Figure 2B:
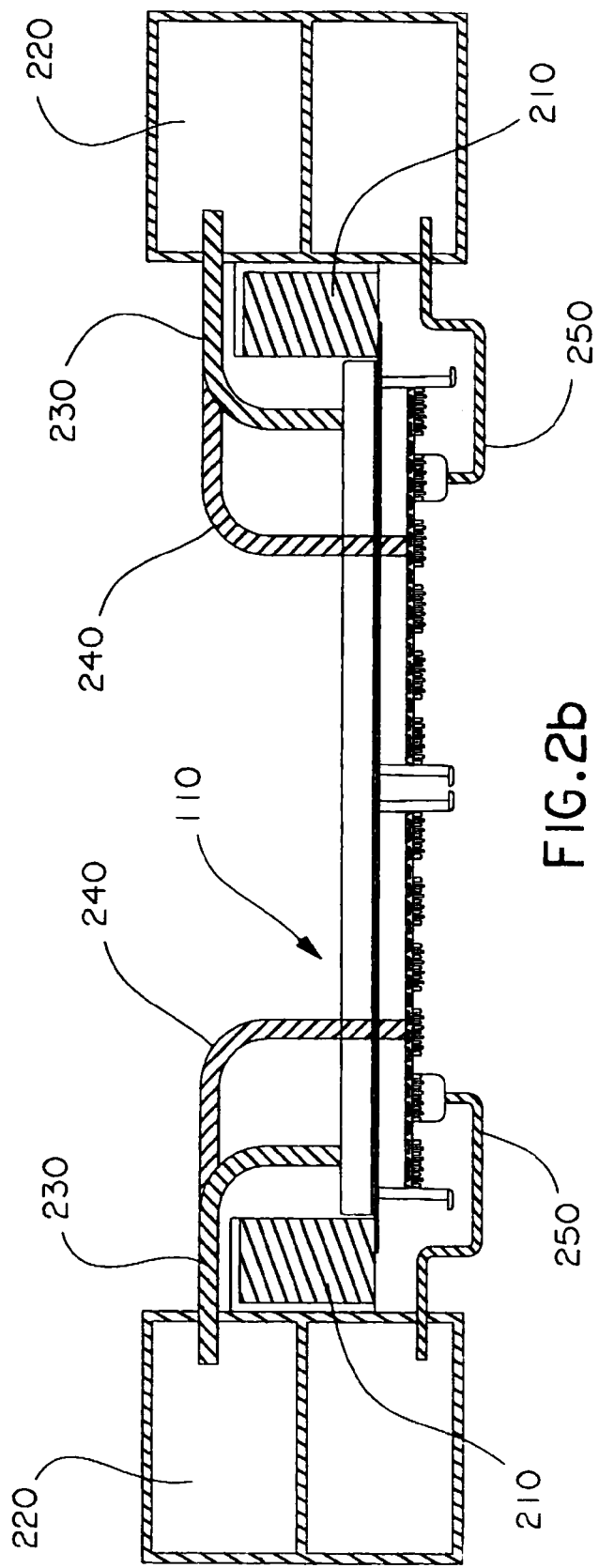
FIG. 2(b) is a top view of an exemplary punchdown panel according to this invention installed in a telecommunications rack.

FIG. 2(b) is a top view of an exemplary punchdown panel 110 according to this invention installed in a telecommunications rack. FIG. 2(b) is a top view of the vertical cable manager 220/telecommunications rack 210/punchdown panel 110 configuration shown in FIG. 2(a), with the additional detail of cables connected to the punchdown panel 110. A first group of cables 230 and a second group of cables 240 are passed from an unshown origin through the vertical cable manager 220 to the back of the punchdown panel 110. The first group of cables 230 is passed through the end access openings 150 to the front of the punchdown panel 110 for connection to insulation displacement connectors 160. The second group of cables 240 is passed through the access channel 180 to the front of the punchdown panel 110 for connection to insulation displacement connectors 160. FIG. 2(b) also shows patch cords 250 passing from the vertical cable manager 220 to the front of the punchdown panel 110.

Figure 3:
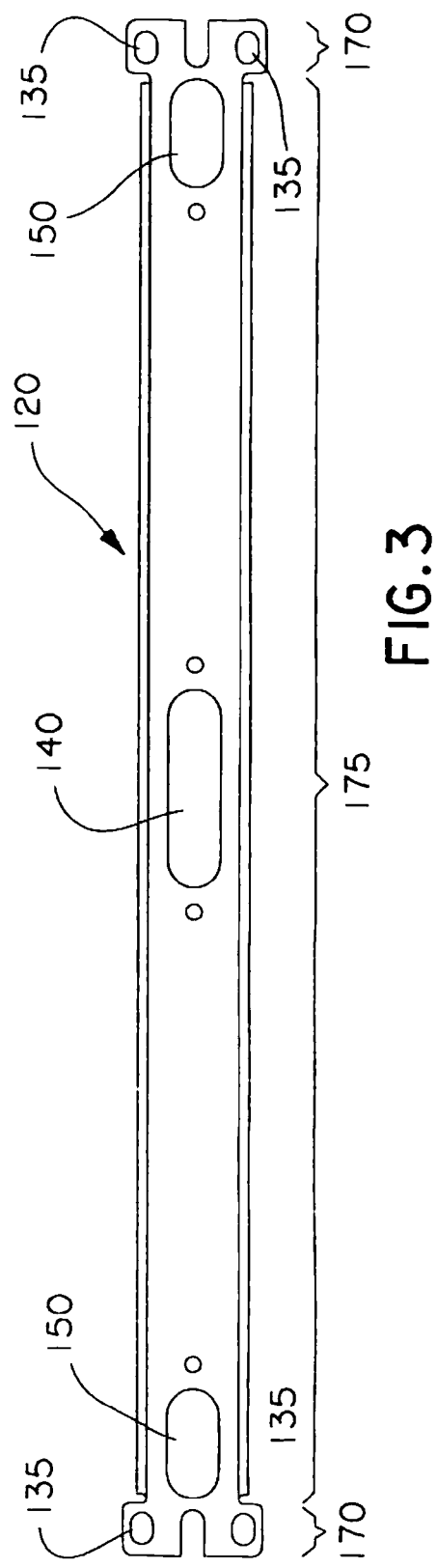
FIG. 3 is a front view of an exemplary punchdown panel according to this invention in which the punchdown bases have been removed.

FIG. 3 is a front view of an exemplary mounting panel 120 for the punchdown panels 110 according to this invention without the overlying punchdown base 130. As discussed with respect to FIG. 1, the mounting panel 120 includes mounting holes 135, which permit the punchdown panel 110 to be mounted to a telecommunications rack 210. The mounting panel 120 also includes a central access opening 140 and end access openings 150, which permit ingress and egress of cables from the back and front of the punchdown panel 110. The mounting panel 120 includes two sections of different widths. The mounting section 170 is wider than the punchdown section 175. When two or more punchdown panels 110 are mounted on a telecommunications rack 210, the wider mounting sections 170 abut, while the adjacent, but spaced, narrower punchdown sections 175 create an access channel 180 between adjacent punchdown panels 110. The access channel 180 allows access to the front of the punchdown panel 110 at any point along the length of the punchdown base 130.

Figure 4:
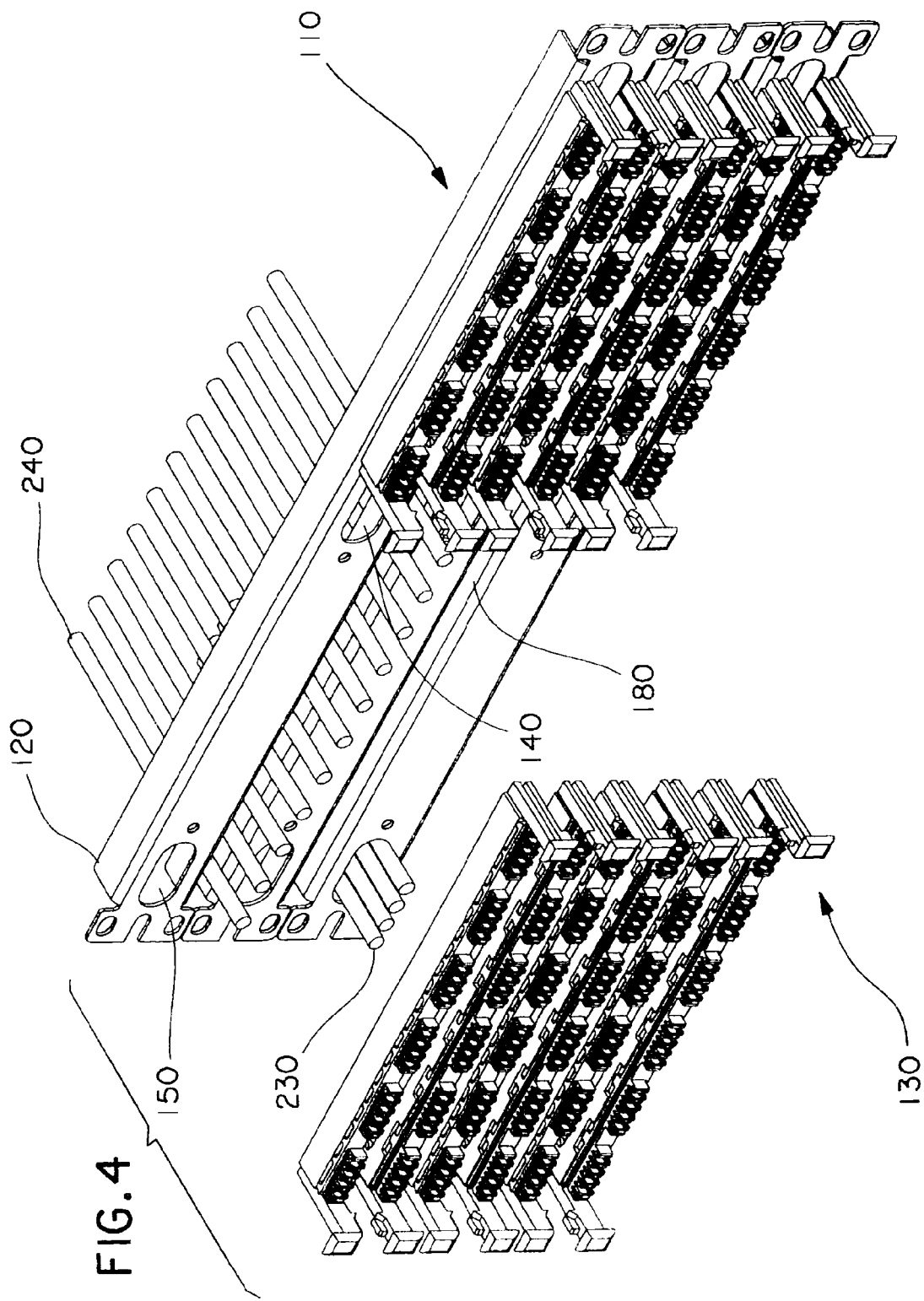
FIG. 4 is a partially exploded perspective view of exemplary punchdown panels according to this invention in which some of the punchdown bases have been removed.

FIG. 4 is a partially exploded perspective view of exemplary punchdown panels 110 according to this invention in which some of the punchdown bases 130 have been removed. In this case, FIG. 4 demonstrates how the central access openings 140, end access openings 150, and access channels 180 permit passage of cables 230, 240 from the back side of the punchdown panel 110 to the front side, where the insulation displacement connectors 160 are situated. A first group of cables 230 and a second group of cables 240 are passed from the back of the punchdown panel 110 to the front. The first group of cables 230 is passed through the end access openings 150 to the front of the punchdown panel 110 for connection to insulation displacement connectors 160. The second group of cables 240 is passed through the access channel 180 to the front of the punchdown panel 110 for connection to insulation displacement connectors 160. As is evident from the positions of the various cables of the second group 240, the access channel 180 allows access to the insulation displacement connectors 160 from the back of the punchdown panel 110 at numerous locations along the length of the punchdown panel 110, in contrast with the limited locations for ingress and egress provided by the center access openings 140 and end access openings 150.

Figure 5:
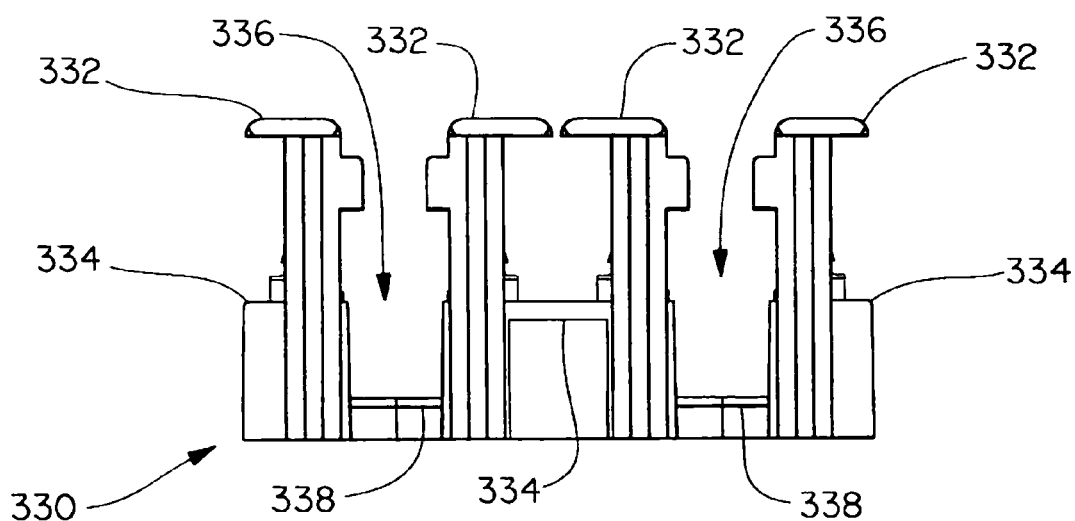
FIG. 5 is a side view of an exemplary punchdown base according to this invention.

FIG. 5 is a side view of an exemplary punchdown base 330 according to this invention. The punchdown base 330 can be used in concert with the punchdown panels 110 discussed with reference to FIGS. 1-4, or with other punchdown panels. The punchdown base 330 includes upright members 332, insulation displacement bases 334 and wire receptacle areas 336 bounded by the upright members 332, insulation displacement bases 334 and substantially planar wire receptacle bases 338.

Figure 6:
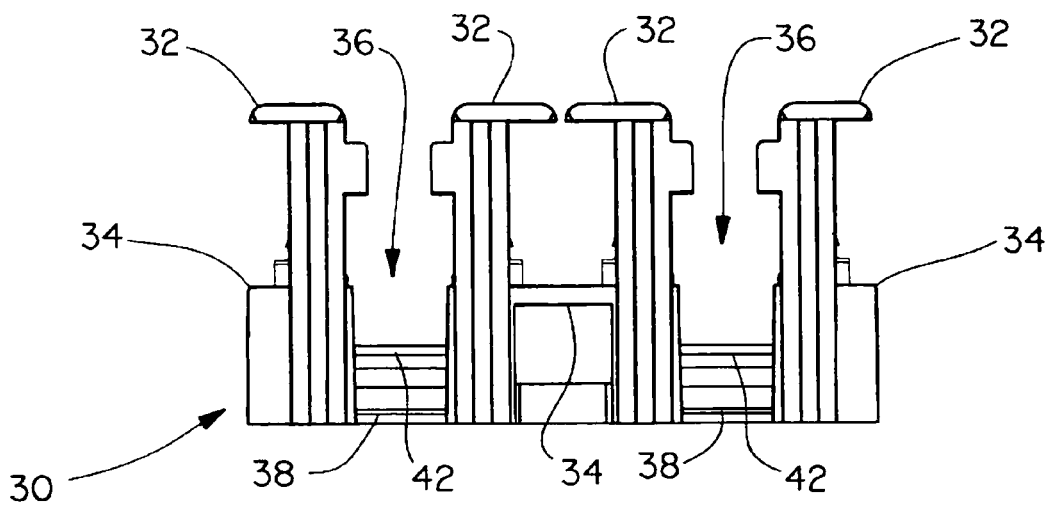
FIG. 6 is a side view of a known punchdown base.

The punchdown base 330 according to this invention provides additional space for wires in the wire receptacle area 336. The origin of this additional space is best observed by comparing the punchdown base 330 according to this invention with a known punchdown base 30, shown in FIG. 6. The known punchdown base 30, like the punchdown base 330 according to this invention, includes upright members 32, insulation displacement bases 34 and wire receptacle areas 36 bounded by the upright members 32, insulation displacement bases 34 and wire receptacle bases 38. The known punchdown base 30 differs from the punchdown base 330 according to this invention in that the known punchdown base 30 includes ribs 42, which provide structural support to the punchdown base 30. The ribs 42 are provided between the upright members 32 and insulation displacement bases 34, and above the wire receptacle bases 38. The presence of the ribs 42 introduces three dimensional features to the wire receptacle bases 38, such that they are not substantially planar. These three dimensional ribs 42 reduce the volume of the wire receptacle areas 36, thus limiting the number and size of wires that can be stored in the wire receptacle area 36. In the punchdown base 330 according to this invention, structural support for the punchdown base 330 is provided below, not above, the wire receptacle bases 338 to retain the substantially planar character of the receptacle bases 338.

Figure 7:
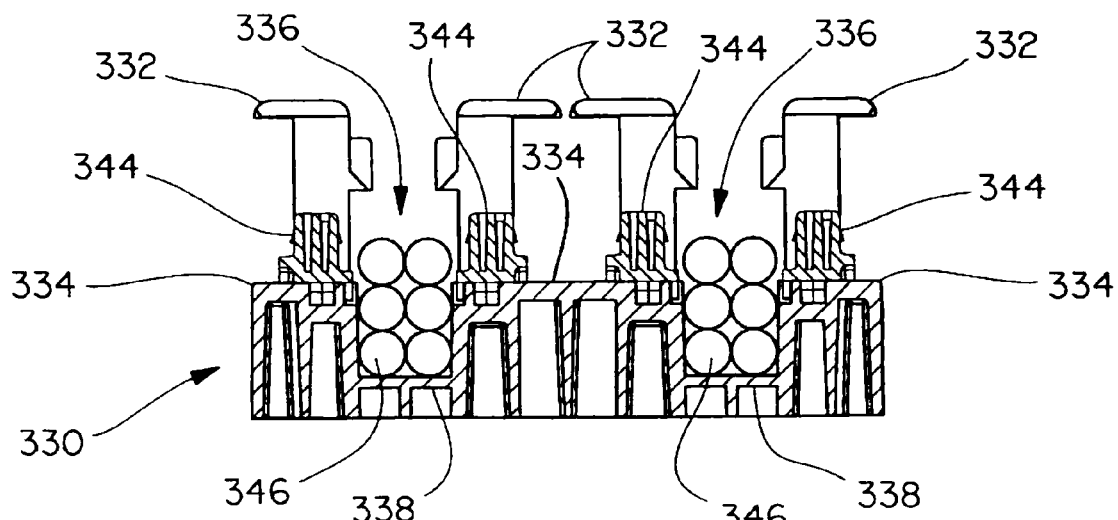
FIG. 7 is a cross-section view of an exemplary punchdown base according to this invention holding multiple cables.

FIG. 7 is a cross-section view of an exemplary punchdown base 330 according to this invention holding multiple wires. FIG. 7 includes the additional detail of insulation displacement connectors 344 situated on the insulation displacement bases 334. As can be seen in FIG. 7, the punchdown base 330 is configured such that multiple wires 346 can be stored in the wire receptacle areas 336 bounded by the upright members 332, the insulation displacement bases 334 and wire receptacle bases 338. As discussed above, this additional space is made possible by avoiding the use of structural supports on or above the wire receptacle bases 338 in the wire receptacle areas 336.

While this invention has been described in conjunction with the exemplary embodiments outlined above, various alternatives, modifications, variations, improvements and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later developed alternatives, modifications, variations, improvements and/or substantial equivalents.

The invention claimed is:

1. A punchdown panel, comprising:
a first mounting panel; and
a punchdown base;
wherein the first mounting panel includes a first mounting section and a first punchdown section, and the first mounting section is greater in width than the first punchdown section such that when the first mounting panel is mounted adjacent a second mounting panel including a second mounting section and a second punchdown section; the first mounting section and the second mounting section abut and an access channel is formed between the first mounting panel and the second mounting panel for retaining a cable.

2. The punchdown panel of claim 1, wherein the first mounting panel is a stamped metal sheet.

3. The punchdown panel of claim 1, wherein the first mounting panel is formed with at least one access opening situated at each end of the first mounting panel.

4. The punchdown panel of claim 1, wherein the first mounting panel is formed with at least one access opening situated at or about the center of the mounting panel.

5. The punchdown panel of claim 1, wherein the punchdown bases are formed from plastic.

6. The punchdown panel of claim 1, wherein the first mounting section and the first punchdown section differ in width by an amount greater than the diameter of a wire suitable for connecting to the first punchdown panel.

7. The punchdown panel of claim 1, wherein tile mounting section and the punchdown section differ in width by about 0.370 inches.

8. The punchdown panel of claim 1, wherein the second mounting panel is formed with at least one mounting hole at each end of the mounting panel.

9. The punchdown panel of claim 8, wherein the at least one mounting hole corresponds in position to a position of at least one mounting structure on a telecommunications rack.

10. The punchdown panel of claim 1, wherein the punchdown base comprises at least one insulation displacement connector.

11. The punchdown panel of claim 10, wherein the at least one insulation displacement connector comprises a plurality of insulation displacement connectors formed in two rows along the length of the punchdown base.

* * * * *

UNITED STATES PATENT AND TRADEMARK OFFICE
CERTIFICATE OF CORRECTION

| | | |
|---|---|---|
| PATENT NO. | : 7,261,590 B2 | Page 1 of 1 |
| APPLICATION NO. | : 11/112163 | |
| DATED | : August 28, 2007 | |
| INVENTOR(S) | : Trevor N. Olsen et al. | |

It is certified that error appears in the above-identified patent and that said Letters Patent is hereby corrected as shown below:

Col. 8, line 19; in Claim 7, "tile" should read --the--.

Signed and Sealed this

Sixth Day of May, 2008

JON W. DUDAS
*Director of the United States Patent and Trademark Office*